(12) United States Patent
Luo

(10) Patent No.: US 11,878,260 B1
(45) Date of Patent: Jan. 23, 2024

(54) THREE PHASE SEPARATION IN A DISTILLATION COLUMN

(71) Applicant: Chevron U.S.A. Inc., San Ramon, CA (US)

(72) Inventor: Huping Luo, Moraga, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 17/877,929

(22) Filed: Jul. 30, 2022

(51) Int. Cl.
*B01D 3/32* (2006.01)
*C10G 7/00* (2006.01)
*B01D 3/18* (2006.01)

(52) U.S. Cl.
CPC .............. *B01D 3/32* (2013.01); *C10G 7/00* (2013.01); *B01D 3/18* (2013.01)

(58) Field of Classification Search
CPC .............. B01D 3/18; B01D 3/32; C10G 7/00
See application file for complete search history.

(56) References Cited

U.S. PATENT DOCUMENTS

| | | | | |
|---|---|---|---|---|
| 2,795,536 A | * | 6/1957 | Pryor | B01D 3/20 202/153 |
| 2,897,147 A | * | 7/1959 | Lely | B01D 3/30 196/114 |
| 3,057,786 A | * | 10/1962 | Waddill | B01J 4/001 95/266 |
| 4,264,538 A | * | 4/1981 | Moore | B01D 53/185 261/97 |
| 4,601,788 A | * | 7/1986 | Bannon | B01D 3/14 202/153 |
| 4,629,534 A | | 12/1986 | Ezell | |
| 4,770,747 A | * | 9/1988 | Muller | B01D 3/008 203/88 |
| 5,516,465 A | * | 5/1996 | Yeoman | F28F 9/22 261/109 |
| 5,632,933 A | * | 5/1997 | Yeoman | B01J 4/001 261/109 |
| 5,645,692 A | | 7/1997 | Gourlia | |
| 6,889,961 B2 | * | 5/2005 | Laird | B01D 3/30 261/96 |

(Continued)

OTHER PUBLICATIONS

International Search Report for PCT/US2023/069724 dated Nov. 9, 2023.

(Continued)

*Primary Examiner* — Jonathan Miller
(74) *Attorney, Agent, or Firm* — King & Spalding LLP (57) ABSTRACT

A phase separation assembly includes a stand pipe configured to be located at a bottom of a distillation column, the stand pipe for directing a liquid phase of a hydrocarbon fluid through a bottom outlet to a heating assembly; a return conduit configured to direct heated hydrocarbon fluid from the heating assembly into the distillation column; a ring baffle configured to be located within the distillation column above the return conduit; and a horizontal plate configured to be disposed above the stand pipe. The ring baffle directs the heated hydrocarbon fluid around the inner circumferential wall of the distillation column so that vapor and liquid phases can separate. Weir features on the ring baffle can facilitate separation of vapor and liquid flows of the hydrocarbon.

18 Claims, 7 Drawing Sheets

(56) References Cited

U.S. PATENT DOCUMENTS

| | | | | |
|---|---|---|---|---|
| 6,889,962 B2* | 5/2005 | Laird | ............ | B01D 3/008 |
| | | | | 261/109 |
| 7,981,253 B2* | 7/2011 | Sharma | ............ | B01D 45/08 |
| | | | | 203/40 |
| 8,286,952 B2* | 10/2012 | Lee | ............ | B01F 25/10 |
| | | | | 261/109 |
| 8,926,799 B2* | 1/2015 | Tamminen | ............ | B01D 3/06 |
| | | | | 261/78.2 |
| 8,974,640 B2* | 3/2015 | Tamminen | ............ | B01D 19/0036 |
| | | | | 261/78.2 |
| 9,266,035 B2* | 2/2016 | Singh | ............ | B01D 3/06 |
| 2006/0089519 A1 | 4/2006 | Stell | | |
| 2011/0308932 A1* | 12/2011 | Tamminen | ............ | B01D 3/14 |
| | | | | 261/114.5 |
| 2015/0143845 A1* | 5/2015 | Wakabayashi | ............ | B01D 3/007 |
| | | | | 62/630 |
| 2015/0158796 A1* | 6/2015 | Valencia | ............ | F25J 3/0266 |
| | | | | 62/625 |
| 2018/0118649 A1* | 5/2018 | Shimizu | ............ | B01D 1/30 |
| 2019/0351350 A1* | 11/2019 | Amblard | ............ | C10G 75/00 |

OTHER PUBLICATIONS

Written Opinion of the ISA for PCT/US2023/069724 dated Nov. 9, 2020.

* cited by examiner

THREE PHASE SEPARATION IN A DISTILLATION COLUMN

TECHNICAL FIELD

Embodiments of the technology relate generally to components for separating three phases in a distillation column.

BACKGROUND

Distillation columns, also referred to as fractionating columns, are used in chemical engineering for distilling fluids. In the hydrocarbon industry, distillation columns are used to separate components of a hydrocarbon feedstock. Among other applications, the hydrocarbon industry uses distillation columns for petroleum refining, as well as the processing of natural gas and petrochemicals. Applying heat to the hydrocarbon feedstock, the distillation column separates the hydrocarbon compounds of the feedstock into a vapor phase and a liquid phase. In addition to the hydrocarbon compounds, the hydrocarbon feedstock can contain one or more of non-hydrocarbon components such as catalysts, particles, or other components (all referred to as a third phase component) that can interfere with the operation of the distillation column. Conventionally, the third phase component can be separated from the hydrocarbon compounds by gravity settling or other known coalescing technology. However, these conventional approaches to separating the third phase component can be ineffective at the bottom portion of a distillation column where the flows of vapor and liquid are highly turbulent. When the third phase component is not separated, its presence can interfere with the proper operation of the furnace or reboiler as well as other components of the distillation column. Accordingly, an improved approach to separating a third phase component from a hydrocarbon feedstock would be beneficial.

SUMMARY

In one example embodiment, the present disclosure is generally directed to a distillation column. The distillation column can comprise: a cylindrical body; a feedstock inlet of the cylindrical body through which a hydrocarbon fluid enters the distillation column; a plurality of trays arranged within the cylindrical body; a stand pipe located at a bottom of the distillation column, the stand pipe directing a liquid phase of the hydrocarbon fluid through a bottom outlet to a heating assembly; a heating assembly return line comprising a return conduit, the heating assembly return line directing a heated hydrocarbon fluid from the heating assembly into the distillation column; a ring baffle located within the cylindrical body and above the return conduit; a horizontal plate disposed above the stand pipe; and a drain line proximate the bottom of the distillation column that directs a third phase component of the hydrocarbon fluid from the bottom of the distillation column to a settling pot.

The foregoing example embodiment can include one or more of the following elements. The return conduit can be in the shape of an elbow or a V-shaped baffle and can direct the heated hydrocarbon fluid along an inner circumference of the distillation column. A vortex breaker can be located in a top opening of the stand pipe and the horizontal plate can be supported by the vortex breaker. The ring baffle can collect, on a top surface of the ring baffle, a liquid phase of the hydrocarbon fluid from downcomers of the plurality of trays and can direct the liquid phase toward the bottom of the distillation column; and can distribute, along a bottom surface of the ring baffle, the heated hydrocarbon fluid across the distillation column.

The ring baffle can comprise at least one top weir that collects a liquid phase of the hydrocarbon fluid from downcomers of the plurality of trays and directs the liquid phase through at least one top aperture toward the bottom of the distillation column.

The ring baffle can comprise at least one bottom weir that directs a vapor phase of the heated hydrocarbon fluid through at least one bottom aperture and upward through a central opening of the ring baffle.

The ring baffle can comprise: at least one top weir that collects a liquid phase of the hydrocarbon fluid from downcomers of the plurality of trays and directs the liquid phase through at least one top aperture toward the bottom of the distillation column; and at least one bottom weir that directs a vapor phase of the heated hydrocarbon fluid through at least one bottom aperture and upward through a central opening of the ring baffle, wherein the at least one top aperture is offset from the at least one bottom aperture to minimize interaction between the liquid phase and the vapor phase.

In the foregoing example, each of the plurality of trays can comprise at least one downcomer. Furthermore, a first tray of the plurality of trays can comprise a first downcomer adjacent to the at least one top weir of the ring baffle and offset from the at least one top aperture.

In another example embodiment, the present disclosure is directed to a phase separation assembly that can be used to retrofit a distillation column or that can be placed in a new distillation column. The phase separation assembly can comprise: a stand pipe configured to be located at a bottom of the distillation column, the stand pipe for directing a liquid phase of a hydrocarbon fluid through a bottom outlet to a heating assembly; a return conduit configured to direct a heated hydrocarbon fluid from the heating assembly into the distillation column; a ring baffle configured to be located within the distillation column above the return conduit; and a horizontal plate configured to be disposed above the stand pipe.

The foregoing example embodiment can include one or more of the following elements. The phase separation assembly can be inserted into and retrofit the distillation column. A vortex breaker can be located in a top opening of the stand pipe and the horizontal plate can be supported by the vortex breaker. The return conduit can be in the shape of an elbow or a V-shaped baffle and can direct the heated hydrocarbon fluid along an inner circumference of the distillation column.

The ring baffle can collect, on a top surface of the ring baffle, a liquid phase of the hydrocarbon fluid from downcomers of the plurality of trays and can direct the liquid phase toward the bottom of the distillation column; and can distribute, along a bottom surface of the ring baffle, the heated hydrocarbon fluid across the distillation column.

The ring baffle can comprise at least one top weir that collects a liquid phase of the hydrocarbon fluid from downcomers of the plurality of trays and directs the liquid phase through at least one top aperture toward the bottom of the distillation column.

The ring baffle can comprise at least one bottom weir that directs a vapor phase of the heated hydrocarbon fluid through at least one bottom aperture and upward through a central opening of the ring baffle.

The ring baffle can comprise: at least one top weir that collects a liquid phase of the hydrocarbon fluid from downcomers of the plurality of trays and directs the liquid phase through at least one top aperture toward the bottom of the distillation column; and at least one bottom weir that directs a vapor phase of the heated hydrocarbon fluid through at least one bottom aperture and upward through a central opening of the ring baffle, wherein the at least one top aperture is offset from the at least one bottom aperture to minimize interaction between the liquid phase and the vapor phase.

In the foregoing example, each of the plurality of trays can comprise at least one downcomer. Furthermore, a first tray of the plurality of trays can comprise a first downcomer adjacent to the at least one top weir of the ring baffle and offset from the at least one top aperture.

In yet another example embodiment, the present disclosure is directed to a method for separating a third phase component from a hydrocarbon feedstock. The method can comprise: directing the hydrocarbon fluid into the distillation column at a feedstock inlet; directing a liquid phase of the hydrocarbon fluid through a stand pipe at a bottom of the distillation column to a heating assembly; receiving a heated hydrocarbon fluid via a heating assembly return line from the heating assembly; directing the heated hydrocarbon fluid along an interior wall of the distillation column using a return fitting attached at the vapor return; distributing a vapor phase of the heated hydrocarbon fluid around the interior wall of the distillation column using a ring baffle; and directing the third phase component that settles in the liquid phase of the hydrocarbon fluid at the bottom of the distillation column to a drain line.

The foregoing example method can include one or more of the following elements. In the foregoing method a horizontal plate can be disposed above the stand pipe. In the foregoing method, the ring baffle can comprise at least one top weir and at least one bottom weir to facilitate separation of the vapor phase and the liquid phase.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of a distillation column and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

The example embodiments discussed herein are directed to apparatus and methods for separating a third phase component within a distillation column. The example apparatus and methods described herein are particularly beneficial in the oil and gas industry where distillation columns are widely used to process hydrocarbon fluids. The apparatus and methods described herein facilitate removal of a third phase component from a hydrocarbon feedstock to improve the operation of the distillation column. The third phase component is distinct from hydrocarbon liquid phase (first phase) and hydrocarbon vapor phase (second phase) that are separated in the distillation column. The third phase component can be any non-hydrocarbon component that is present in the hydrocarbon feedstock flowing into the distillation column, including catalysts, particles, or other components.

As one example, the third phase component can be an ionic liquid catalyst that is combined with feeds of olefin and/or paraffin in an alkylation process. Thorough mixing of the ionic liquid catalyst during the alkylation process results in fine ionic liquid catalyst droplets that are difficult to remove from the alkylate product effluent. As a result, the fine ionic liquid catalyst droplets are carried with the hydrocarbon feedstock into the downstream distillation column where they can accumulate in the liquid phase at the bottom of the distillation column and can interfere with the proper operation of the distillation column. Given the highly turbulent flows of vapor and liquid in the bottom portion of the distillation column, the ionic liquid catalyst will not easily settle out of the hydrocarbon liquid at the bottom of the distillation column. Instead, the ionic liquid catalyst can be cycled through the heating assembly and the reactions of the distillation column wherein the ionic liquid catalyst interferes with the proper operation of the distillation column. Accordingly, techniques for separating a third phase component such as the ionic liquid catalyst from the hydrocarbon liquid and hydrocarbon vapor phases allows for improved operation of the distillation column. It should be understood that the ionic liquid catalyst is merely one example of the third phase components that can be separated from the hydrocarbon liquid and vapor phases using the techniques described herein.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Figure 1:
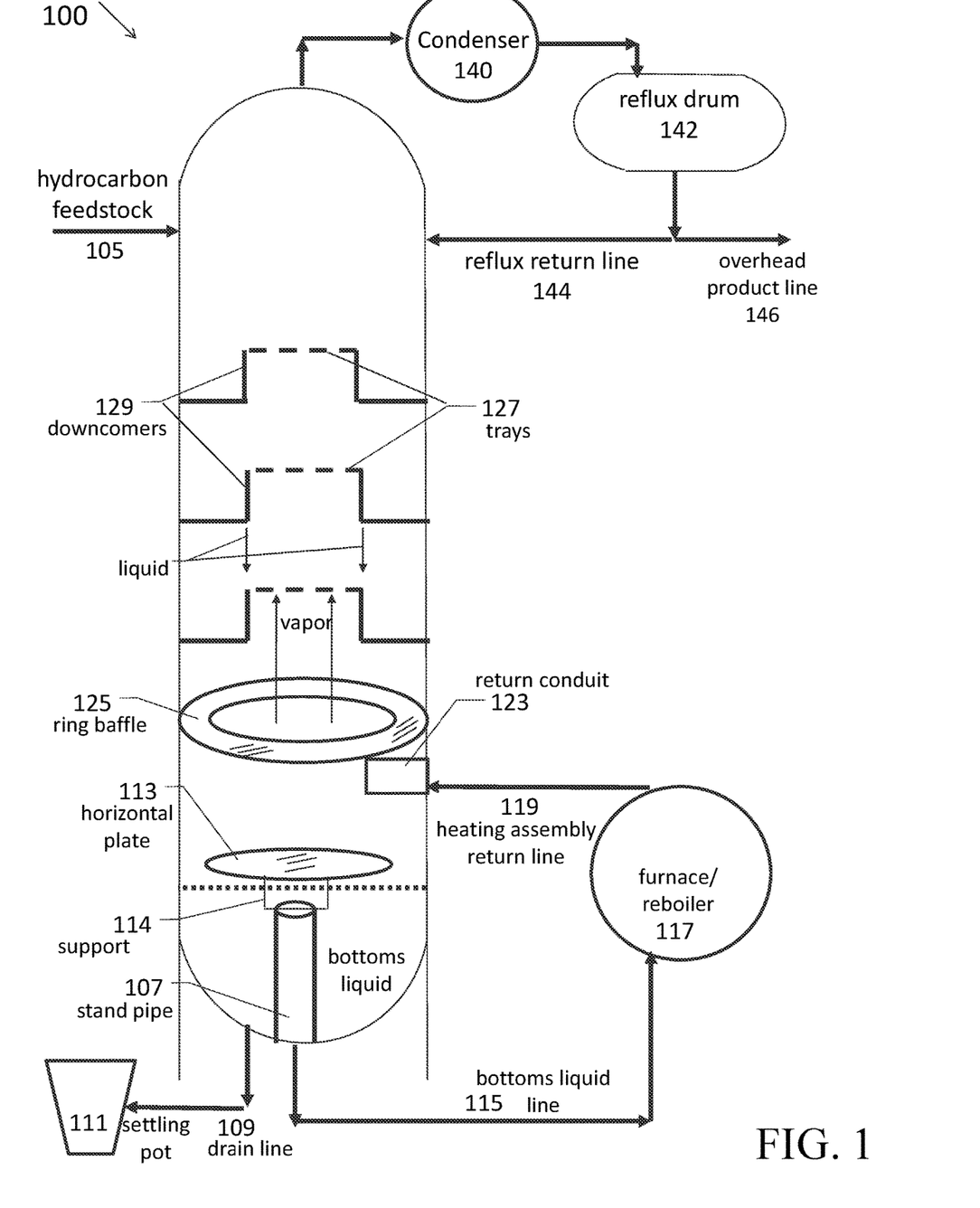
FIG. 1 illustrates internal components of a distillation column in accordance with an example embodiment of the disclosure.

FIG. 1 illustrates one example distillation column in accordance with embodiments of the present disclosure. It should be understood that the example embodiments described herein can be applied to other types of distillation columns as well.

FIG. 1 illustrates certain internal and external components associated with a distillation column 100. Distillation column 100 can be used in the refining of hydrocarbons. A hydrocarbon feedstock enters the distillation column 100 at hydrocarbon feedstock inlet 105. As referenced previously, before entering the distillation column 100, the hydrocarbon feedstock can be subjected to processing, including the introduction of a third phase component into the hydrocarbon feedstock. The hydrocarbon feedstock can also be referred to as a hydrocarbon fluid comprising a mixture of hydrocarbon liquid and vapor phases, along with the third phase component. As the hydrocarbon feedstock flows down the distillation column, it passes over trays 127 and downcomers 129 located along the length of the distillation column. While flowing over the trays 127 and the downcomers 129, there will be some separation of the hydrocarbon feedstock into a hydrocarbon vapor phase that travels toward the top of the distillation column and a hydrocarbon liquid phase that accumulates at the bottom of the distillation column. While the trays 127 are illustrated with two downcomers (one on each side) in the example of FIG. 1, it should be understood that in alternate embodiments a tray can have a single downcomer.

The hydrocarbon liquid phase that accumulates at the bottom of the distillation column 100 can be referred to as bottoms liquid. As illustrated in FIG. 1, a stand pipe 107 is vertically oriented and placed at the bottom of the distillation column 100. When sufficient bottoms liquid accumulates at the bottom of the distillation column that it exceeds the height of the stand pipe 107, the bottoms liquid can flow through a top opening of the stand pipe 107 and exit the distillation column 100 through a bottoms liquid line 115. The bottoms liquid line 115 directs the hydrocarbon liquid phase to a heating assembly 117. The heating assembly 117 can be a furnace, a steam reboiler, or other appropriate equipment for heating the hydrocarbon liquid phase to convert it to a heated hydrocarbon fluid comprising a vapor phase and a liquid phase. The heated hydrocarbon fluid is returned to the distillation column 100 via heating assembly return line 119. Once the heated hydrocarbon fluid returns to the distillation column 100, the component that is the hydrocarbon vapor phase flows upward passing through perforations in the trays 127. At the top of the distillation column 100, the hydrocarbon vapor phase can exit and pass through a condenser 140 and a reflux drum 142. A portion of the hydrocarbon will be returned to the distillation column via reflux return line 144, while another portion can be redirected via an overhead product line 146.

As referenced previously, the hydrocarbon feedstock that enters the distillation column 100 via inlet 105 can include a third phase component. The third phase component can collect with the hydrocarbon liquid phase at the bottom of the distillation column 100. Ideally, the third phase component would settle at the bottom of the distillation column and be removed via drain line 109 and settling pot 111. However, in conventional distillation columns a substantial amount of turbulence exists in the fluid flows at the bottom of the distillation column. This substantial turbulence prevents the third phase component from settling out of the hydrocarbon liquid phase at the bottom of the distillation column. When the third phase component fails to settle out of the hydrocarbon liquid phase, it is cycled to the heating assembly and interferes with the other operations of the distillation column.

Accordingly, the example embodiment illustrated in FIG. 1 introduces components that reduce turbulence and encourage settling of the third phase component at the bottom of the distillation column 100. In particular, the example embodiment of FIG. 1 includes a return conduit 123 that receives the heated hydrocarbon fluid from heating assembly return line 119. The return conduit 123 can direct the hydrocarbon vapor phase of the heated hydrocarbon fluid along the inner circumference of the distillation column 100. The return conduit 123 can take the form of an elbow that directs the hydrocarbon vapor in one direction along the inner circumference of the distillation column. As non-limiting examples, the elbow can have a bend in the range of 70 to 90 degrees to direct the hydrocarbon vapor along the inner circumference of the distillation column 100. As another example, the return fitting 123 can take the form of a V-baffle that splits the incoming heated hydrocarbon fluid so that portions of the hydrocarbon vapor are sent in opposite directions along the inner circumference of the distillation column 100.

Located above the return conduit 123 is a ring baffle 125. The ring baffle 125 can be attached to the inner circumference of the distillation column 100 and directs the flow of the hydrocarbon vapor along the bottom surface of the ring baffle 125 and around the inner circumference of the distillation column 100. The ring baffle 125 encourages more even distribution of the hydrocarbon vapor as it flows along the inner circumference of the distillation column 100. The combination of the ring baffle 125 and return conduit 123 produces a substantial flow along the inner circumference of the distillation column 100 that enhances separation of the liquid phase and vapor phase of the heated hydrocarbon liquid as well as any third phase due to the different densities of the phases. The more even distribution of the heated hydrocarbon fluid as it exits the return conduit 123 and travels along the bottom of the ring baffle 125 and along the inner circumference of the distillation column provides time for liquid particles and third phase particles in the hydrocarbon vapor to separate from the hydrocarbon vapor phase. As the heavier liquid and third phase particles separate from the vapor phase along the bottom of the ring baffle 125, they fall downward and collect at the bottom of the distribution column 100. In contrast, the lighter hydrocarbon vapor travels around the inner edge of the ring baffle 125 and upward through the central opening of the ring baffle 125 toward the top of the distillation column. As such the return conduit 123 and the ring baffle 125 work together to evenly distribute the flow of hydrocarbon vapor in a circumferential direction along the interior of the distribution column, thereby reducing turbulence and allowing the heavier liquid and third phase particles to separate from the hydrocarbon vapor. When the third phase components settle at the bottom of the distillation column 100, they can be removed via the drain line 109. Preferably, the drain line 109 is located at the bottom of the distillation column and near the stand pipe in order to minimize a dead volume zone below the drain line 109 where third phase components would collect without being removed via the drain line 109.

The example embodiment of FIG. 1 includes additional components at the bottom portion of the distillation column 100 to reduce turbulence and encourage settling of third phase components. Specifically, a horizontal plate 113 is mounted on a support 114 above the stand pipe 107. The horizontal plate 113 directs hydrocarbon liquid and third phase components away from the opening at the top of the stand pipe 107 so that third phase particles do not fall into the opening at the top of the stand pipe 107. In other words, the third phase particles falling toward the bottom of the distillation column 100 are not able to fall into the opening at the top of the stand pipe 107 where they would interfere with the heating assembly 117. Instead, the third phase particles and hydrocarbon liquid falling downward are directed toward the outer circumference within the distillation column so that the third phase particles can settle at the bottom of the distillation column 100. The horizontal plate 113 can take a variety of shapes and dimensions in order to prevent third phase components from falling into the opening at the top of the stand pipe. As representative examples, the horizontal plate 113 can be circular and can have a diameter that ranges from at least one-third to up to two-thirds of the inner diameter of the distillation column at the height where the horizontal plate is located As an additional and optional component, the support 114 can comprise a vortex breaker that prevents a vortex from forming at the opening of the stand pipe 107. A vortex forming at the opening of the stand pipe 107 could draw third phase particles floating in the bottoms liquid into the stand pipe 107. Accordingly, a vortex breaker can prevent a vortex from forming and can assist in encouraging the settling of third phase particles at the bottom of the distillation column. The vortex breaker can take a variety of forms, including a mesh device or a device with fins that prevent a vortex from forming.

The internal components of the distillation column 100, including the return conduit 123, the ring baffle 125, the horizontal plate 113, and the support 114, are preferably made of a material, such as metals or alloys, that can withstand the corrosive environment encountered within a distillation column.

Figure 2:
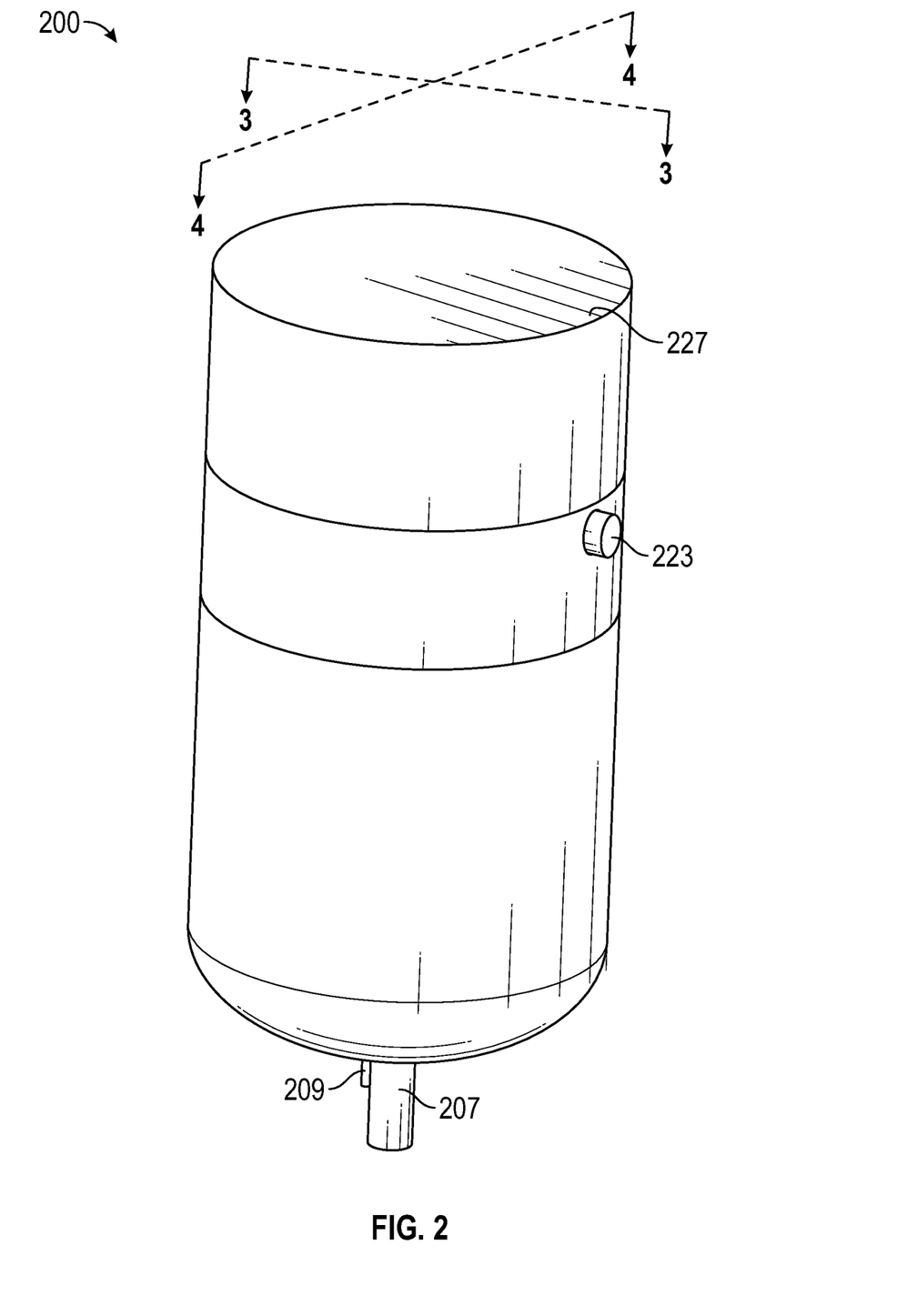
FIG. 2 illustrates an external view of a bottom portion of a distillation column in accordance with an example embodiment of the disclosure.
Figure 3:
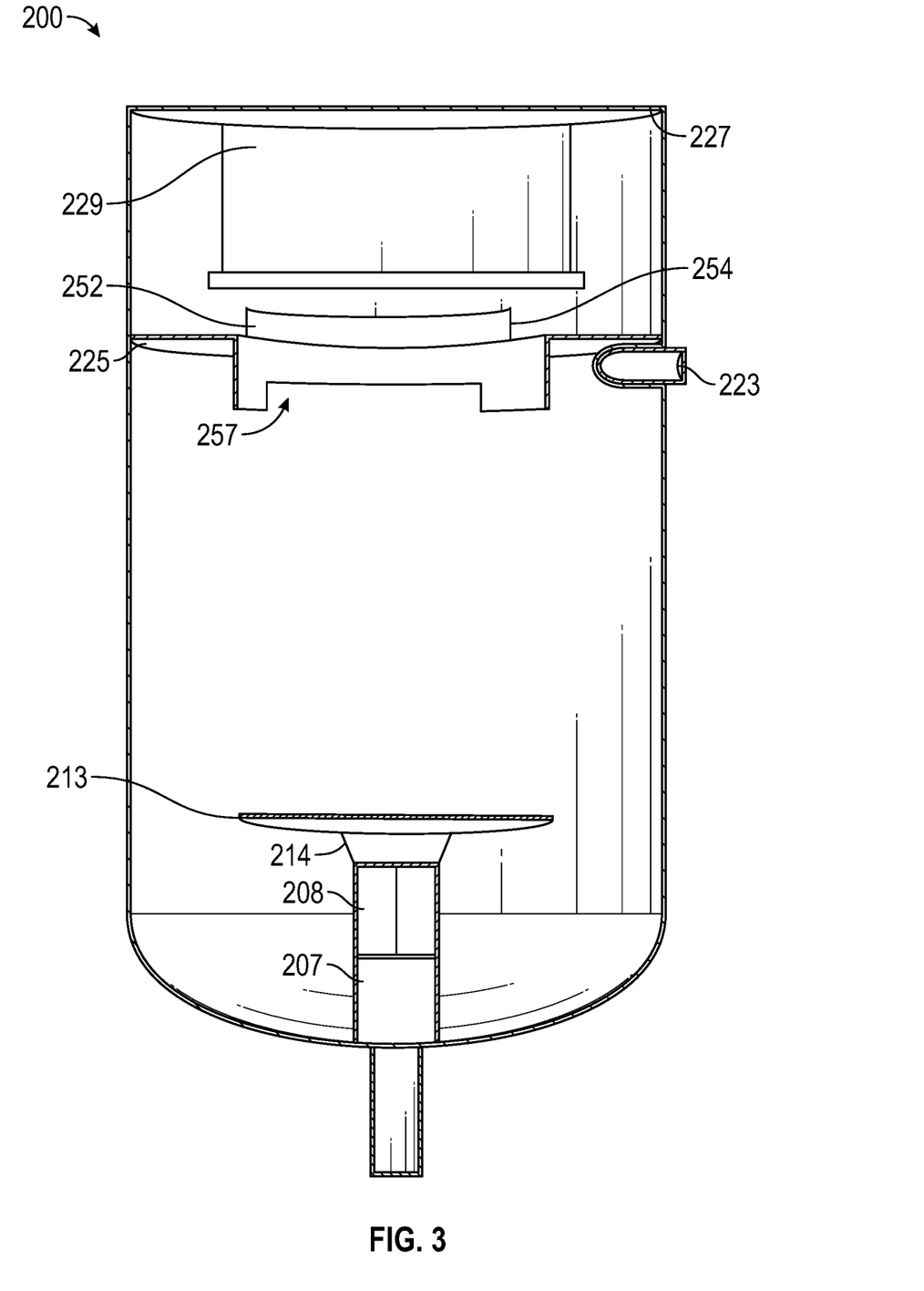
FIG. 3 illustrates a cross section of the bottom portion of the distillation column of FIG. 2 in accordance with an example embodiment of the disclosure.
Figure 4:
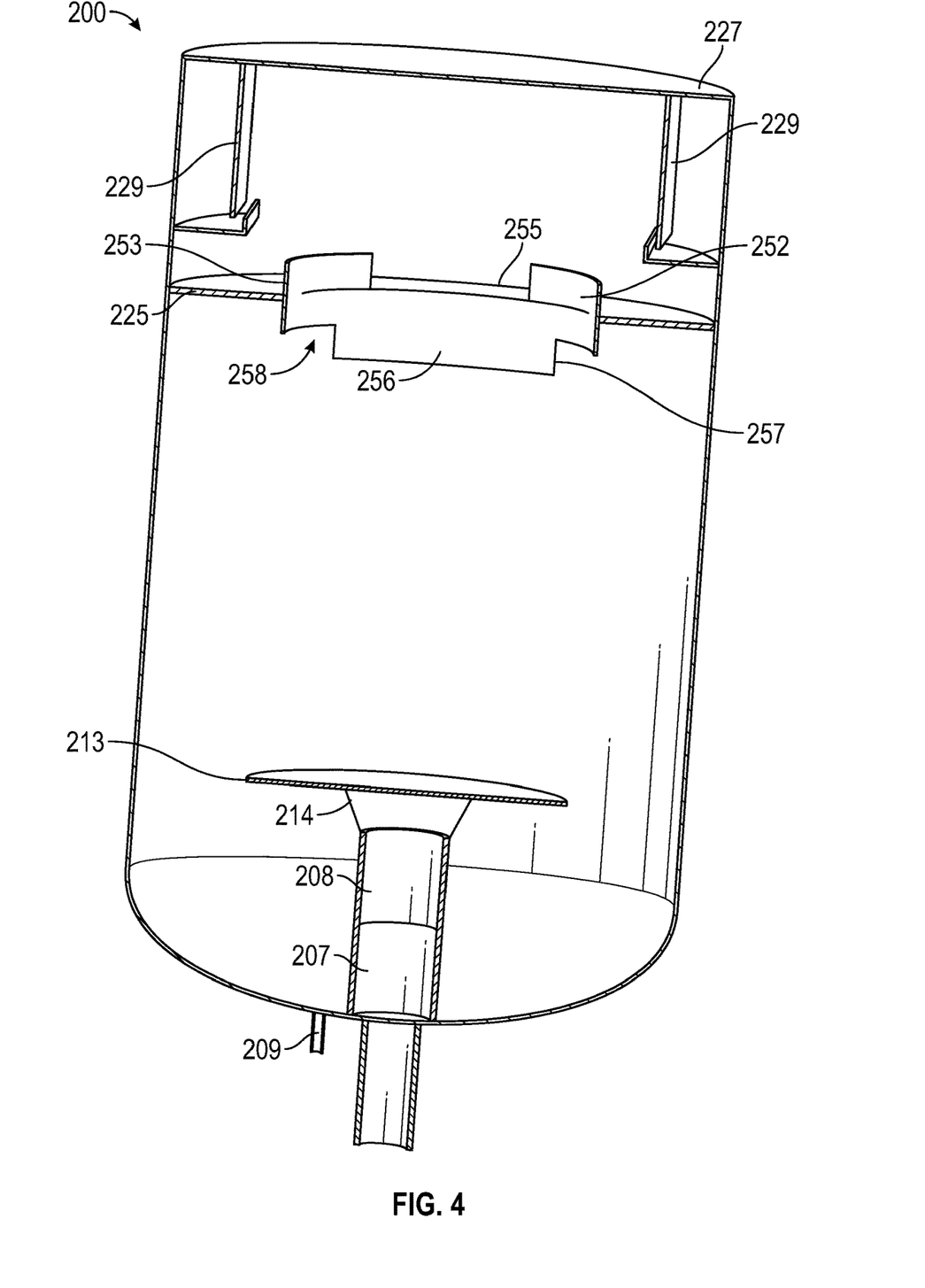
FIG. 4 illustrates another cross section of the bottom portion of the distillation column of FIG. 2 in accordance with an example embodiment of the disclosure.

Referring now to FIGS. 2, 3, and 4, another example embodiment is illustrated. FIG. 2 provides a view of the exterior of a bottom portion of a distillation column 200, whereas FIGS. 3 and 4 provide cross-sectional views of the interior of the bottom portion of the distillation column 200. Those components in FIGS. 2-4 that are similar to or analogous to components illustrated in FIG. 1 have same last two digits in their reference numbers and it should be understood that the previous descriptions provided in connection with FIG. 1 apply to the similar or analogous components of FIGS. 2-4 unless otherwise noted below.

Similar to distillation column 100 of FIG. 1, distillation column 200 of FIG. 2 includes a stand pipe 207 through which hydrocarbon liquid exits the distillation column 200 and is directed to a heating assembly (not shown in FIG. 2). A return conduit 223 receives heated hydrocarbon fluid from the heating assembly and directs the vapor and liquid components of the heated hydrocarbon fluid along the inner circumference of the distillation column 200. As shown in FIGS. 3 and 4, distillation column 200 also includes trays and downcomers along its length, such as tray 227 with downcomers 229.

Ring baffle 225 is located above return conduit 223 and directs heated hydrocarbon fluid from the return conduit 223 about the inner circumference of the distillation column 200. As in FIG. 1, by directing the heated hydrocarbon fluid along the inner circumference of the distillation column 200, the ring baffle 225 distributes the heated hydrocarbon fluid more evenly and provides time for hydrocarbon liquid particles and third phase particles to separate from the hydrocarbon vapor and move downward toward the bottom of the distillation column 200.

Ring baffle 225 differs from ring baffle 125 in that it includes features to assist in separating hydrocarbon liquid that is flowing down from downcomers and hydrocarbon vapor that is flowing upward through the central opening of the ring baffle 225. Specifically, ring baffle 225 includes a bottom weir 256 extending from the bottom surface of the ring baffle 225 as well as first and second top weirs 252 and 253 extending from the top surface of the ring baffle 225. The bottom weir 256 includes two cut out portions referred to as the first bottom vent 257 and the second bottom vent 258. On the top side of the ring baffle 225, a first top aperture 254 and a second top aperture 255 are disposed between the first top weir 252 and the second top weir 253. The bottom weir 256 assists in directing hydrocarbon vapor as it flows along the bottom surface of the ring baffle 225 and along the inner circumference of the distillation column 200 until the vapor reaches the first bottom vent 257 or second bottom vent 258 whereupon the hydrocarbon vapor flows through the first or second bottom vent 257, 258 and then upward through the central opening of the ring baffle 225. The first top weir 252 and second top weir 253 direct hydrocarbon liquid as it flows down from the downcomers 229 and onto the ring baffle 225. The first top weir 252 and second top weir 253 direct the hydrocarbon liquid that accumulates on the top side of the ring baffle 225 toward the first top aperture 254 and second top aperture 255. As can be seen in FIGS. 3 and 4, the first top aperture 254 and the second top aperture 255 are offset from the first bottom vent 257 and the second bottom vent 258 to inhibit mixing of the downward flowing hydrocarbon liquid and the upward flowing hydrocarbon vapor. As such, the ring baffle 225 encourages separation of the hydrocarbon liquid from the hydrocarbon vapor so that the third phase component, which accompanies the hydrocarbon liquid, will flow to the bottom of the distillation column where it can settle out.

The internal components at the bottom of the distillation column 200 also are visible in FIGS. 3 and 4. Specifically, a horizontal plate 213 is a disk shaped plate positioned above the stand pipe 207 to prevent the third phase component from falling directly into the opening at the top of the stand pipe 207. A vortex breaker 208 is located in the opening at the top of the stand pipe 207 to prevent the formation of a vortex that would draw particles of the third phase component into the stand pipe 207. A support 214 is attached to the top of the vortex breaker 208 and supports the bottom surface of the horizontal plate 213. In other embodiments, the horizontal plate and the support can take other forms. For example, the horizontal plate can be supported by attachments to the inner circumferential wall of the distillation column instead of being supported from the stand pipe 207.

Figure 5:
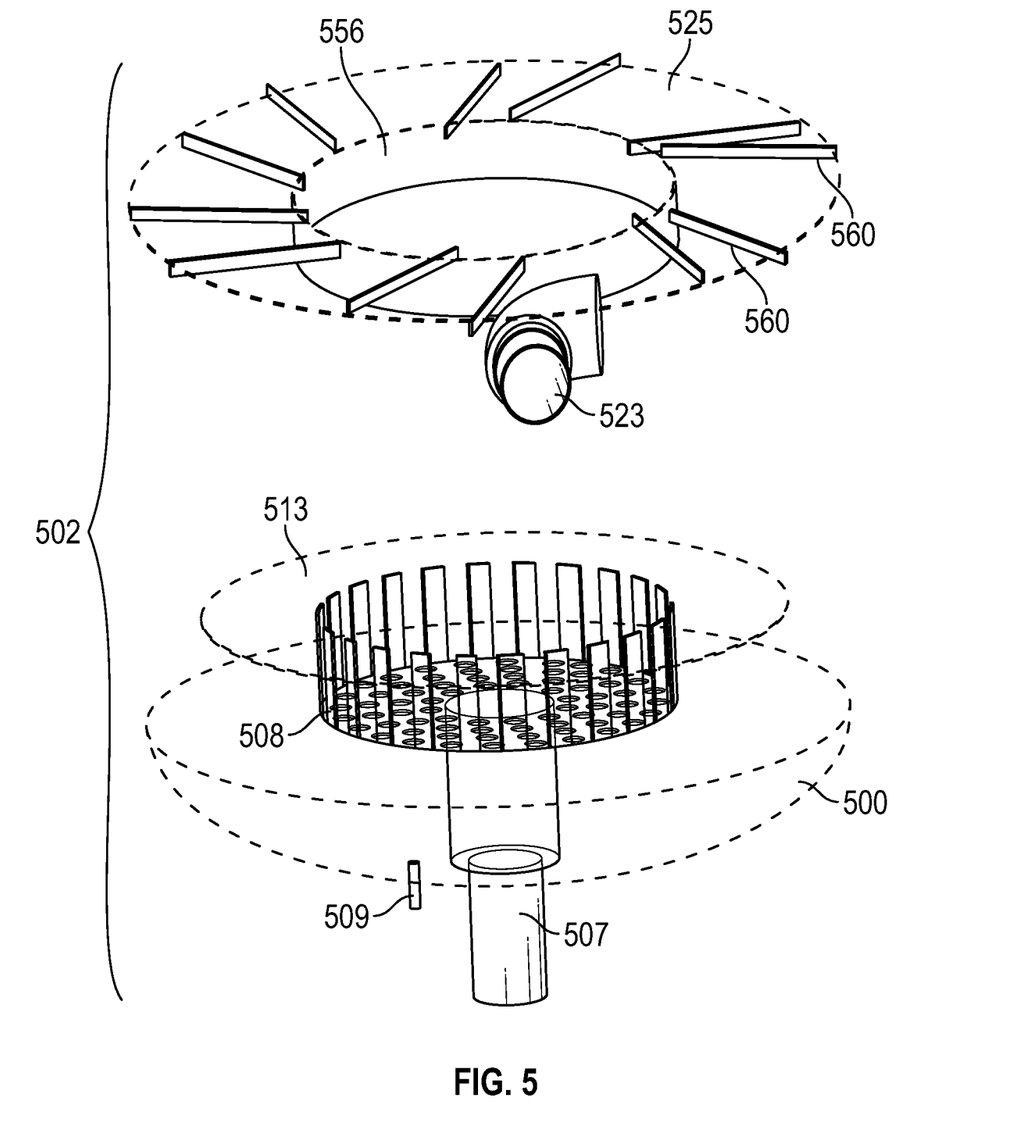
FIG. 5 illustrates components of a phase separation assembly to be used in a distillation column in accordance with an example embodiment of the disclosure.

Referring now to FIG. 5, another example embodiment is illustrated. The embodiment of FIG. 5 can be referred to as a phase separation assembly 502 that comprises components that can be installed in a distillation column. As one example, the phase separation assembly 502 can be installed to retrofit an existing distillation column. As another example, the phase separation assembly 502 can be installed in a new distillation column. It should be understood that phase separation assemblies modeled on the components of the other embodiments disclosed herein also can be used to retrofit existing distillation columns or installed in new distillation columns. Certain of the components of the phase separation assembly 502 are shown in broken lines in FIG. 5 in order to illustrate other components and not obscure those other components. Those components in FIG. 5 that are similar to or analogous to components illustrated in FIGS. 1-4 have the same last two digits in their reference numbers and it should be understood that the previous descriptions provided in connection with FIGS. 1-4 apply to the similar or analogous components of FIG. 5 unless otherwise noted below.

The example phase separation assembly 502 of FIG. 5 includes a stand pipe 507 located at the bottom of the distillation column 500. Only a portion of the bottom of the distillation column 500 is illustrated in FIG. 5. Also located at the bottom of the distillation column 500 is a drain line 509. The stand pipe 507 and the drain line 509 are similar to the analogous components described in connection with the previous figures. A vortex breaker 508 in the form of a metallic mesh filter is placed in the opening at the top of the stand pipe 507. A horizontal plate 513 is supported by the vortex breaker 508 and performs a similar function as the previously described top plates.

The return conduit 523 of the phase separation assembly 502 is in the form of an elbow with a 90 degree bend. Ring baffle 525 is located above the return conduit 523 when the components are installed in a distillation column so that heated hydrocarbon fluid entering at the return conduit 523 is directed along the bottom surface of the ring baffle 525 and along the inner circumference of the distillation column. Similar to the ring baffle 225 of FIGS. 2-4, ring baffle 525 includes a bottom weir 556 to guide the hydrocarbon vapor around the bottom surface of the ring baffle 525 and to prevent the hydrocarbon vapor from immediately moving upward through the central opening of the ring baffle 525. Distributing the heated hydrocarbon fluid as it proceeds along the bottom surface of the ring baffle 525 provides time for hydrocarbon liquid particles and third phase particles to separate from the hydrocarbon vapor. Ring baffle 525 also differs from the previous ring baffles in that it has angled protrusions 560 along the top and bottom surfaces of the ring baffle 525. The protrusions 560 slow the flow of hydrocarbon vapor both along the top and bottom surfaces of the ring baffle 525.

Figure 7:
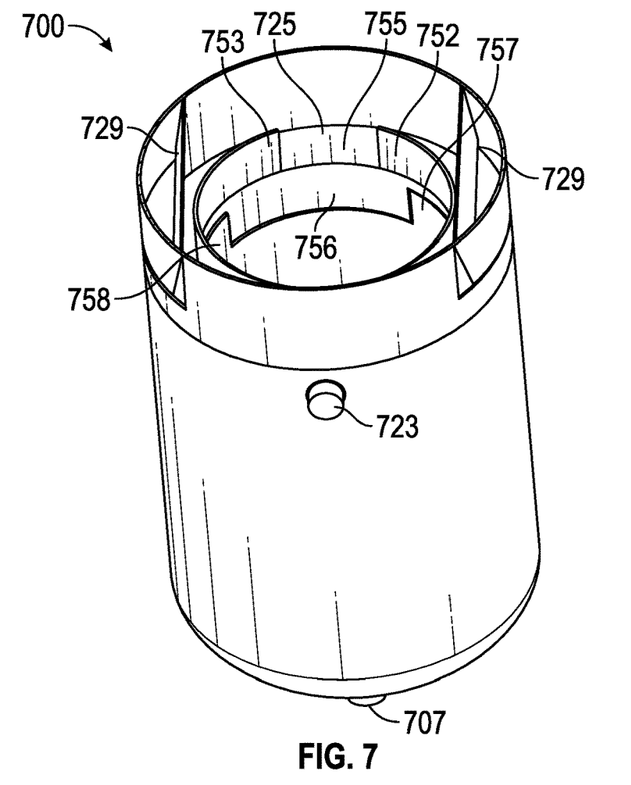
FIGS. 7 and 8 illustrate components of a bottom portion of a distillation column in accordance with another example embodiment of the disclosure.
Figure 8:
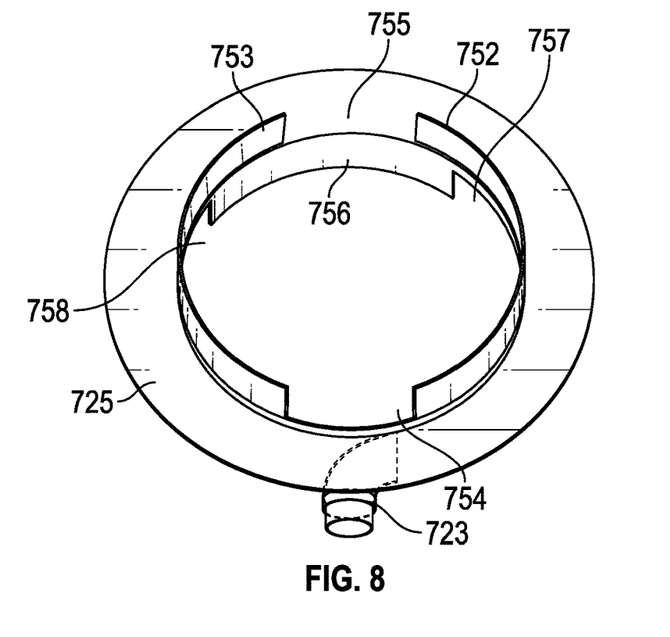

Referring now to FIGS. 7 and 8, components of a bottom portion of a distillation column in accordance with another example embodiment of the disclosure are illustrated. The example embodiment of FIGS. 7 and 8 is similar to the previous embodiments, but with certain design modifications that can improve the ability to separate the third phase from the hydrocarbon fluid. Those components in FIGS. 7 and 8 that are similar to or analogous to components illustrated in FIGS. 1-5 have the same last two digits in their reference numbers and it should be understood that the previous descriptions provided in connection with FIGS. 1-5 apply to the similar or analogous components of FIGS. 7 and 8 unless otherwise noted below.

Similar to distillation column 100 of FIG. 1, distillation column 700 of FIG. 7 includes a stand pipe 707 through which hydrocarbon liquid exits the distillation column 700 and is directed to a heating assembly (not shown in FIG. 7). A return conduit 723 receives heated hydrocarbon fluid from the heating assembly and directs the vapor and liquid components of the heated hydrocarbon fluid along the inner circumference of the distillation column 700. Although not shown in FIG. 7, distillation column 700 also includes trays and downcomers along its length above the components in the bottom portion of the column similar to the trays and downcomers described in connection with FIGS. 1-4.

Ring baffle 725 is located above return conduit 723 and directs heated hydrocarbon fluid from the return conduit 723 about the inner circumference of the distillation column 700. As in FIG. 1, by directing the heated hydrocarbon fluid along the inner circumference of the distillation column 700, the ring baffle 725 distributes the heated hydrocarbon fluid more evenly and provides time for hydrocarbon liquid particles and third phase particles to separate from the hydrocarbon vapor and move downward toward the bottom of the distillation column 700.

Ring baffle 725 differs from ring baffle 125 in that it includes features to assist in separating hydrocarbon liquid that is flowing down from downcomers and hydrocarbon vapor that is flowing upward through the central opening of the ring baffle 725. Specifically, ring baffle 725 includes a bottom weir 756 extending from the bottom surface of the ring baffle 725 as well as first and second top weirs 752 and 753 extending from the top surface of the ring baffle 725. The bottom weir 756 includes two cut out portions referred to as the first bottom vent 757 and the second bottom vent 758. On the top side of the ring baffle 725, a first top aperture 754 and a second top aperture 755 are disposed between the first top weir 752 and the second top weir 753. The bottom weir 756 assists in directing hydrocarbon vapor as it flows along the bottom surface of the ring baffle 725 and along the inner circumference of the distillation column 200 until the vapor reaches the first bottom vent 757 or second bottom vent 758 whereupon the hydrocarbon vapor flows through the first or second bottom vent 757, 758 and then upward through the central opening of the ring baffle 725. The first top weir 752 and second top weir 753 direct hydrocarbon liquid as it flows down from the downcomers 729, which are located on opposite sides and above the ring baffle 725, and onto the ring baffle 725. The first top weir 752 and second top weir 753 direct the hydrocarbon liquid that accumulates on the top side of the ring baffle 725 toward the first top aperture 754 and second top aperture 755. As can be seen in FIGS. 7 and 8, the first top aperture 754 and the second top aperture 755 are offset from the first bottom vent 757 and the second bottom vent 758 to inhibit mixing of the downward flowing hydrocarbon liquid and the upward flowing hydrocarbon vapor. As such, the ring baffle 725 encourages separation of the hydrocarbon liquid from the hydrocarbon vapor so that the third phase component, which accompanies the hydrocarbon liquid, will flow to the bottom of the distillation column where it can settle out.

It should be assumed that the internal components at the bottom of the distillation column 700 are similar to those in the examples of FIGS. 1-5. Specifically, the internal components can include a horizontal plate that is a disk shaped plate positioned above the stand pipe 707 to prevent the third phase component from falling directly into the opening at the top of the stand pipe 707. A vortex breaker can be located in the opening at the top of the stand pipe 707 to prevent the formation of a vortex that would draw particles of the third phase component into the stand pipe 707. A support can support the bottom surface of the horizontal plate. In other embodiments, the horizontal plate and the support can take a variety of forms. For example, the horizontal plate can be supported by attachments to the inner circumferential wall of the distillation column instead of being supported from the stand pipe 707.

Figure 6:
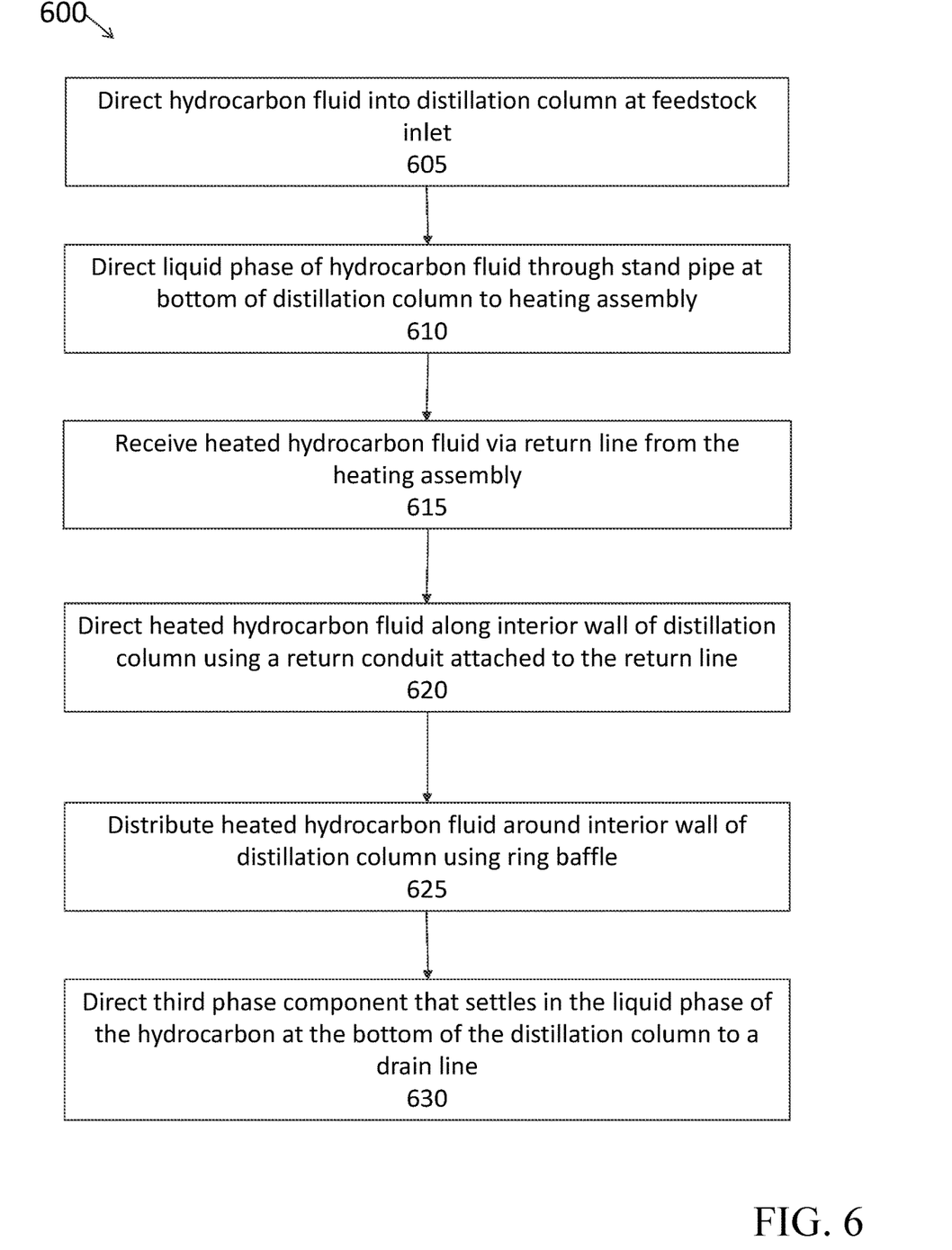
FIG. 6 is a flowchart illustrating a method of using a phase separation assembly in accordance with an example embodiment of the disclosure.

Referring now to FIG. 6, an example method 600 is illustrated for using the phase separation techniques described herein. It should be understood that method 600 is a non-limiting example and in alternate embodiments certain steps of method 600 may be modified, combined, performed in parallel, or omitted.

Beginning with operation 605, a hydrocarbon fluid is directed into a distillation column at a hydrocarbon feedstock inlet. The hydrocarbon fluid can comprise a first phase in the form of a hydrocarbon liquid, a second phase in the form of a hydrocarbon vapor, and a third phase in the form non-hydrocarbon particles. In operation 610, the hydrocarbon liquid accumulates at the bottom of the distillation column and when the height of the hydrocarbon liquid exceeds the height of a stand pipe at the bottom of the distillation column, the hydrocarbon liquid flows into the stand pipe and out of the distillation column to a heating assembly. After heating, in operation 615, the hydrocarbon is returned as a heated hydrocarbon fluid comprising vapor and liquid phases via a heating assembly return line connected to a side wall of the distillation column. In operation 620, a return conduit, which can be in the form of an elbow or a V-baffle, directs the heated hydrocarbon fluid from the heating assembly return line and along the interior circumferential wall of the distillation column. A ring baffle guides the heated hydrocarbon fluid comprising vapor and liquid phases around the interior circumferential wall of the distillation column in operation 625. Guiding the heated hydrocarbon fluid around the interior circumferential wall reduces turbulence and causes hydrocarbon liquid particles and third phase particles to separate from the vapor phase and move toward the bottom of the distillation column. The hydrocarbon liquid particles and third phase particles that drop towards the center of the bottom of the distillation column will be deflected by a horizontal plate so that they do not directly enter the top opening of the stand pipe. In operation 630, the third phase component that settles in the liquid phase of the hydrocarbon at the bottom of the distillation column can be drained via a drain line to a settling pot. As such, the phase separation components of the example embodiments assist in reducing turbulence in the hydrocarbon flows near the bottom of the distribution column and encourage settling of the third phase components at the bottom of the distribution column so that they do not flow into the stand pipe and interfere with the operations of the distillation column.

For any figure shown and described herein, one or more of the components may be omitted, added, repeated, and/or substituted. Additionally, it should be understood that in certain cases components of the example systems can be combined or can be separated into subcomponents. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Terms such as "first", "second", "top", "bottom", "side", "distal", "proximal", and "within" are used merely to distinguish one component (or part of a component or state of a component) from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a," "an," and "the" are intended to include plural alternatives, e.g., at least one. The terms "including", "with", and "having", as used herein, are defined as comprising (i.e., open language), unless specified otherwise.

When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Numerical end points of ranges disclosed herein are approximate, unless excluded by proviso.

Values, ranges, or features may be expressed herein as "about", from "about" one particular value, and/or to "about" another particular value. When such values, or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, ±3% of the stated value, or ±1% of the stated value.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A distillation column comprising:
a cylindrical body;
a feedstock inlet of the cylindrical body through which a hydrocarbon fluid enters the distillation column;
a plurality of trays arranged within the cylindrical body;
a stand pipe located at a bottom of the distillation column, the stand pipe directing a liquid phase of the hydrocarbon fluid through a bottom outlet to a heating assembly;
a heating assembly return line comprising a return conduit, the heating assembly return line directing a heated hydrocarbon fluid from the heating assembly into the distillation column;
a ring baffle located within the cylindrical body and above the return conduit, the ring baffle comprising:
a first top weir and a second top weir extending upward from an inner perimeter of the ring baffle, wherein the first top weir and the second top weir direct the liquid phase of the hydrocarbon fluid to a first top aperture and a second top aperture of the ring baffle; and at least one bottom weir extending downward from the inner perimeter of the ring baffle, wherein the at least one bottom weir directs a vapor phase of the heated hydrocarbon fluid through a bottom vent of the ring baffle;

wherein the first top aperture and the second top aperture are offset from the bottom vent to minimize interaction between the liquid phase and the vapor phase;

a horizontal plate disposed above the stand pipe; and a drain line proximate the bottom of the distillation column that directs a third phase component of the hydrocarbon fluid from the bottom of the distillation column to a settling pot.

2. The distillation column of claim 1, wherein the return conduit is in the shape of an elbow or V-shaped baffle, and wherein the return conduit directs the heated hydrocarbon fluid along an inner circumference of the distillation column.

3. The distillation column of claim 1, further comprising: a vortex breaker located in a top opening of the stand pipe.

4. The distillation column of claim 1, wherein the ring baffle:
collects, on a top surface of the ring baffle, the liquid phase of the hydrocarbon fluid from downcomers of the plurality of trays and directs the liquid phase toward the bottom of the distillation column; and
distributes, along a bottom surface of the ring baffle, the heated hydrocarbon fluid across the distillation column.

5. The distillation column of claim 1, wherein the first top weir is adjacent a first downcomer and directs the liquid phase from the first downcomer to the first and second top apertures of the ring baffle; and
wherein the second top weir is adjacent a second downcomer and directs the liquid phase from the second downcomer to the first and second top apertures of the ring baffle.

6. The distillation column of claim 5, wherein a first tray of the plurality of trays comprises the first downcomer adjacent to the first top weir of the ring baffle and offset from the first top aperture and the second top aperture.

7. The distillation column of claim 1, wherein the horizontal plate is supported by a support attached to the stand pipe.

8. A phase separation assembly for installation in a distillation column, the phase separation assembly comprising:
a stand pipe configured to be located at a bottom of the distillation column, the stand pipe for directing a liquid phase of a hydrocarbon fluid through a bottom outlet to a heating assembly;
a return conduit configured to direct a heated hydrocarbon fluid from the heating assembly into the distillation column;
a horizontal plate configured to be disposed above the stand pipe; and
a ring baffle configured to be located within the distillation column above the return conduit, the ring baffle comprising:
a first top weir and a second top weir extending upward from an inner perimeter of the ring baffle, wherein the first top weir and the second top weir direct the liquid phase of the hydrocarbon fluid to a first top aperture and a second top aperture of the ring baffle; and
at least one bottom weir extending downward from the inner perimeter of the ring baffle, wherein the at least one bottom weir directs a vapor phase of the heated hydrocarbon fluid through a bottom vent of the ring baffle;
wherein the first top aperture and the second top aperture are offset from the bottom vent to minimize interaction between the liquid phase and the vapor phase.

9. The phase separation assembly of claim 8, wherein the phase separation assembly is inserted into and retrofits the distillation column.

10. The phase separation assembly of claim 8, further comprising:
a vortex breaker located in a top opening of the stand pipe.

11. The phase separation assembly of claim 8, wherein the return conduit is in the shape of an elbow or V-shaped baffle, and wherein the return conduit directs the heated hydrocarbon fluid along an inner circumference of the distillation column.

12. The phase separation assembly of claim 8, wherein the ring baffle:
collects, on a top surface of the ring baffle, the liquid phase of the hydrocarbon fluid from downcomers of the plurality of trays and directs the liquid phase toward the bottom of the distillation column; and
distributes, along a bottom surface of the ring baffle, the heated hydrocarbon fluid across the distillation column.

13. The phase separation assembly of claim 8, wherein, when the phase separation assembly is installed in the distillation column, the first top weir is configured to receive the liquid phase from a first downcomer and direct the liquid phase to the first and second top apertures of the ring baffle; and
wherein the second top weir is configured to receive the liquid phase from a second downcomer and direct the liquid phase to the first and second top apertures of the ring baffle.

14. The phase separation assembly of claim 13, wherein, when the phase separation assembly is installed in the distillation column, a first tray of a plurality of trays comprises the first downcomer adjacent to the first top weir of the ring baffle and offset from the first top aperture and the second top aperture.

15. The phase separation assembly of claim 8, wherein the horizontal plate is supported by a support attached to the stand pipe.

16. A method of separating a third phase component from a hydrocarbon fluid in a distillation column, the method comprising:
directing the hydrocarbon fluid into the distillation column at a feedstock inlet;
directing a liquid phase of the hydrocarbon fluid through a stand pipe at a bottom of the distillation column to a heating assembly;
receiving a heated hydrocarbon fluid via a heating assembly return line from the heating assembly;
directing the heated hydrocarbon fluid along an interior wall of the distillation column using a return conduit attached at the heating assembly return line;
distributing a vapor phase of the heated hydrocarbon fluid around the interior wall of the distillation column using a ring baffle, the ring baffle located along the interior wall of the distillation column and above the return conduit, the ring baffle comprising:
- a first top weir and a second top weir extending upward from an inner perimeter of the ring baffle, wherein the first top weir and the second top weir direct the liquid phase of the hydrocarbon fluid to a first top aperture and a second top aperture of the ring baffle; and
- at least one bottom weir extending downward from the inner perimeter of the ring baffle, wherein the at least one bottom weir directs a vapor phase of the heated hydrocarbon fluid through a bottom vent of the ring baffle;
- wherein the first top aperture and the second top aperture are offset from the bottom vent to minimize interaction between the liquid phase and the vapor phase; and directing the third phase component that settles in the liquid phase of the hydrocarbon fluid at the bottom of the distillation column to a drain line.

17. The method of claim 16, wherein a horizontal plate is disposed above the stand pipe.

18. The method of claim 16, further comprising a vortex breaker located in a top opening of the stand pipe.

* * * * *